US007927206B2

(12) United States Patent
Baerlocher et al.

(10) Patent No.: US 7,927,206 B2
(45) **Date of Patent: *Apr. 19, 2011**

(54) GAMING DEVICE HAVING A RE-TRIGGERING SYMBOL BONUS SCHEME

(75) Inventors: Anthony J. Baerlocher, Reno, NV (US); Ryan W. Cuddy, Reno, NV (US)

(73) Assignee: IGT, Reno, NV (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/031,629

(22) Filed: Feb. 14, 2008

(65) Prior Publication Data

US 2008/0139296 A1 Jun. 12, 2008

Related U.S. Application Data

(63) Continuation of application No. 11/156,112, filed on Jun. 17, 2005, now Pat. No. 7,331,867, which is a continuation of application No. 09/981,133, filed on Oct. 15, 2001, now Pat. No. 6,913,532.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .................. 463/20; 463/25; 463/16; 463/1; 463/40; 273/143 R; 273/138.1; 273/138.2

(58) Field of Classification Search ........................ None
See application file for complete search history.

(56) References Cited

U.S. PATENT DOCUMENTS 4,198,052 A 4/1980 Gauselmann
4,624,459 A 11/1986 Kaufman
4,695,053 A 9/1987 Vazquez, Jr. et al.
5,205,555 A 4/1993 Hamano
5,393,057 A 2/1995 Marnell, II
5,407,200 A 4/1995 Zalabak
5,423,539 A 6/1995 Nagao
5,449,173 A 9/1995 Thomas et al.
5,456,465 A 10/1995 Durham
5,560,603 A 10/1996 Seelig et al.

(Continued)

FOREIGN PATENT DOCUMENTS

AU 771847 3/2001

(Continued)

OTHER PUBLICATIONS

Addams Family Article written by IGT, published in 2000.

(Continued)

*Primary Examiner* — Paul A. D'Agostino
(74) *Attorney, Agent, or Firm* — K&L Gates LLP

(57) ABSTRACT

A gaming device having a bonus scheme wherein a combination of bonus symbols trigger a bonus game and any one of the bonus symbols in the bonus game provides a player with an award. The award may be an extension of the bonus game by providing the player with additional spins or games. Also, the award may modify the combination and type of bonus symbols needed to enter the bonus game. Furthermore, the award may modify the award values in the bonus game. Therefore, a combination bonus symbols trigger the bonus game and also triggers the gaming device to provide bonus awards in the bonus game. The re-triggering symbol award bonus scheme changes the probability of winning for the player and therefore creates a higher level of excitement and enjoyment of the game.

39 Claims, 6 Drawing Sheets

U.S. PATENT DOCUMENTS

| | | | |
|---|---|---|---|
| 5,647,798 | A | 7/1997 | Falciglia |
| 5,722,891 | A | 3/1998 | Inoue |
| 5,772,506 | A | 6/1998 | Marks et al. |
| 5,775,692 | A | 7/1998 | Watts et al. |
| 5,788,573 | A | 8/1998 | Baerlocher et al. |
| 5,823,874 | A | 10/1998 | Adams |
| 5,855,514 | A | 1/1999 | Kamille |
| 5,918,880 | A | 7/1999 | Voigt, IV et al. |
| 5,935,002 | A | 8/1999 | Falciglia |
| 5,947,820 | A | 9/1999 | Morro et al. |
| 5,964,463 | A | 10/1999 | Moore, Jr. |
| 5,971,849 | A | 10/1999 | Falciglia |
| 5,980,384 | A | 11/1999 | Barrie |
| 5,988,638 | A | 11/1999 | Rodesch et al. |
| 6,003,867 | A | 12/1999 | Rodesch et al. |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,056,642 | A | 5/2000 | Bennett |
| 6,059,289 | A | 5/2000 | Vancura |
| 6,089,976 | A | 7/2000 | Schneider et al. |
| 6,102,400 | A | 8/2000 | Scott et al. |
| 6,126,542 | A | 10/2000 | Fier |
| 6,135,884 | A | 10/2000 | Hedrick et al. |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,190,254 | B1 | 2/2001 | Bennett |
| 6,190,255 | B1 | 2/2001 | Thomas et al. |
| 6,203,429 | B1 | 3/2001 | Demar et al. |
| 6,220,959 | B1 | 4/2001 | Holmes, Jr. et al. |
| 6,224,483 | B1 | 5/2001 | Mayeroff |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,270,409 | B1 | 8/2001 | Shuster |
| 6,270,411 | B1 | 8/2001 | Gura et al. |
| 6,305,686 | B1 | 10/2001 | Perrie et al. |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,328,649 | B1 | 12/2001 | Randall et al. |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,364,766 | B1 | 4/2002 | Anderson et al. |
| 6,364,768 | B1 | 4/2002 | Acres et al. |
| 6,368,216 | B1 | 4/2002 | Hedrick et al. |
| 6,375,567 | B1 | 4/2002 | Acres |
| 6,394,902 | B1 | 5/2002 | Glavich et al. |
| 6,398,218 | B1 | 6/2002 | Vancura |
| 6,398,644 | B1 | 6/2002 | Perrie et al. |
| 6,443,452 | B1 | 9/2002 | Brune |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,533,658 | B1 | 3/2003 | Walker et al. |
| 6,537,150 | B1 | 3/2003 | Luciano et al. |
| 6,537,152 | B2 | 3/2003 | Seelig et al. |
| 6,561,904 | B2 | 5/2003 | Locke et al. |
| 6,565,436 | B1 | 5/2003 | Baerlocher |
| 6,602,137 | B2 | 8/2003 | Kaminkow et al. |
| 6,604,740 | B1 | 8/2003 | Singer et al. |
| 6,712,694 | B1 | 3/2004 | Nordman |
| 6,733,389 | B2 | 5/2004 | Webb et al. |
| 6,805,349 | B2 | 10/2004 | Baerlocher et al. |
| 6,869,360 | B2 | 3/2005 | Marks et al. |
| 6,905,406 | B2 | 6/2005 | Kaminkow et al. |
| 6,913,532 | B2 | 7/2005 | Baerlocher et al. |
| 6,921,335 | B2 | 7/2005 | Rodgers et al. |
| 6,955,600 | B2 | 10/2005 | Glavich et al. |
| 6,995,600 | B2 | 2/2006 | Rogenmoser et al. |
| 7,235,011 | B2 | 6/2007 | Randall et al. |
| 7,238,110 | B2 | 7/2007 | Glavich et al. |
| 7,258,611 | B2 | 8/2007 | Bigelow, Jr. et al. |
| 7,322,887 | B2 | 1/2008 | Belger et al. |
| 7,331,867 | B2 | 2/2008 | Baerlocher et al. |
| 2001/0009865 | A1 | 7/2001 | Demar et al. |
| 2002/0010017 | A1 | 1/2002 | Bennett |
| 2003/0060272 | A1 | 3/2003 | Glavich et al. |
| 2005/0075163 | A1 | 4/2005 | Cuddy et al. |
| 2005/0233801 | A1 | 10/2005 | Baerlocher et al. |
| 2007/0287521 | A1 | 12/2007 | Glavich et al. |

FOREIGN PATENT DOCUMENTS

| | | | |
|---|---|---|---|
| EP | 0 874 337 | A1 | 10/1998 |
| EP | 0 981 119 | A2 | 2/2000 |
| GB | 2 322 217 | A | 8/1998 |
| WO | WO 00/32286 | | 6/2000 |
| WO | WO 01/26019 | A1 | 4/2001 |

OTHER PUBLICATIONS

Big Business Advertisement, written by Video, published prior to Feb. 2008.

Catch A Wave Advertisement written by IGT, published in Dec. 2000.

Dolphin Treasure Advertisement written by Aristocrat Leisure Industries Pty. Ltd., published in 1996.

Ghoulish Gamble Advertisement written by Strictly Slots, published in Nov. 2000.

Money in the Bank, published in Strictly Slots, available Jun. 2001.

Spin Til You Win Game Description written by IGT, published in 1996.

Top Dollar Advertisement written by IGT, published in 1998.

Triple Bucks Advertisement written by IGT, published in 1999.

Winning Bid Advertisement written by WMS Gaming Inc., published prior to Jan. 2001.

Wild Bear Salmon Run Advertisement, written by IGT, published in 2003.

GAMING DEVICE HAVING A RE-TRIGGERING SYMBOL BONUS SCHEME

PRIORITY CLAIM

This application is a continuation of and claims the benefit of U.S. patent application Ser. No. 11/156,112, filed Jun. 17, 2005, which is a continuation of U.S. patent application Ser. No. 09/981,133, filed Oct. 15, 2001, now issued U.S. Pat. No. 6,913,532, the entire contents of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present invention relates in general to a gaming device, and more particularly to a gaming device having a re-triggering symbol bonus scheme.

The base or primary game of most slot machines involves one or more mechanical or video spinning reels, each of which display a plurality of symbols. In many such games, a triggering event such as a symbol or combination of symbols yield one or more opportunities or chances in a bonus or secondary game, which is played in addition to the base game.

It is desirable to provide players with new and different gaming devices with new and different bonus schemes for the enjoyment and entertainment of players.

SUMMARY

One embodiment of the present invention provides a gaming device having a slot base game and a slot bonus game wherein one or more bonus triggering symbols in the base game are employed as bonus re-triggers in the bonus game. In one preferred embodiment, the occurrence of a predetermined combination of a plurality of bonus triggering symbols (such as three bonus triggering symbols along a payline) in a base game triggers a corresponding bonus game. In that bonus game, the same bonus triggering symbols in any position (i.e., a scatter pay) functions as the bonus re-trigger in the bonus game which causes one or more additional activations of the reels or one or more re-triggers of that entire bonus game. The probability of obtaining the bonus re-trigger in the bonus game which is based on the same bonus symbols needed to trigger the bonus game in the base game is greater than the probability of obtaining the bonus trigger in the base game because the combination of bonus triggering symbols can occur anywhere on the reels in the bonus game to cause the bonus re-trigger (i.e., a scatter pay).

Accordingly, the present invention provides a gaming device, which includes a symbol or symbol combination in a primary or base game which triggers a secondary or bonus game, and a symbol or symbol combination in the secondary or bonus game which is more likely to occur in the bonus game and which re-triggers the secondary or bonus game or a portion thereof. More generally, the present invention provides a gaming device which includes a bonus triggering event in a primary or base game which triggers a secondary or bonus game and a bonus re-triggering event in the secondary or bonus game which re-triggers the secondary or bonus game or a portion thereof. The bonus triggering event in the primary or base game and the bonus re-triggering event in the secondary or bonus game preferably employ the same symbols or symbol combinations such that the bonus re-triggering event in the secondary or bonus game is more likely to occur in the bonus game than the bonus triggering event in the primary or base game.

The bonus re-trigger in the bonus game may, for instance, provide the player a bonus game extension such as additional or free spins in the bonus game, a replay of the entire bonus game, or a modification to the bonus game such as changing the bonus re-triggering symbol or bonus re-triggering combination of symbols in the bonus game. The bonus-retrigger can alternatively cause other changes in the bonus game as desired by the game implementer. For instance, the bonus re-trigger may cause a modification of the bonus award pay scale or table such as doubling or tripling subsequent award values in the bonus game.

It is therefore an advantage to provide a gaming device having a re-triggering symbol bonus scheme.

Other features and advantages will be apparent from the following detailed disclosure, taken in conjunction with the accompanying sheets of drawings, wherein like numerals refer to like parts, elements, components, steps and processes.

DETAILED DESCRIPTION

Gaming Device and Electronics

Figure 1A:
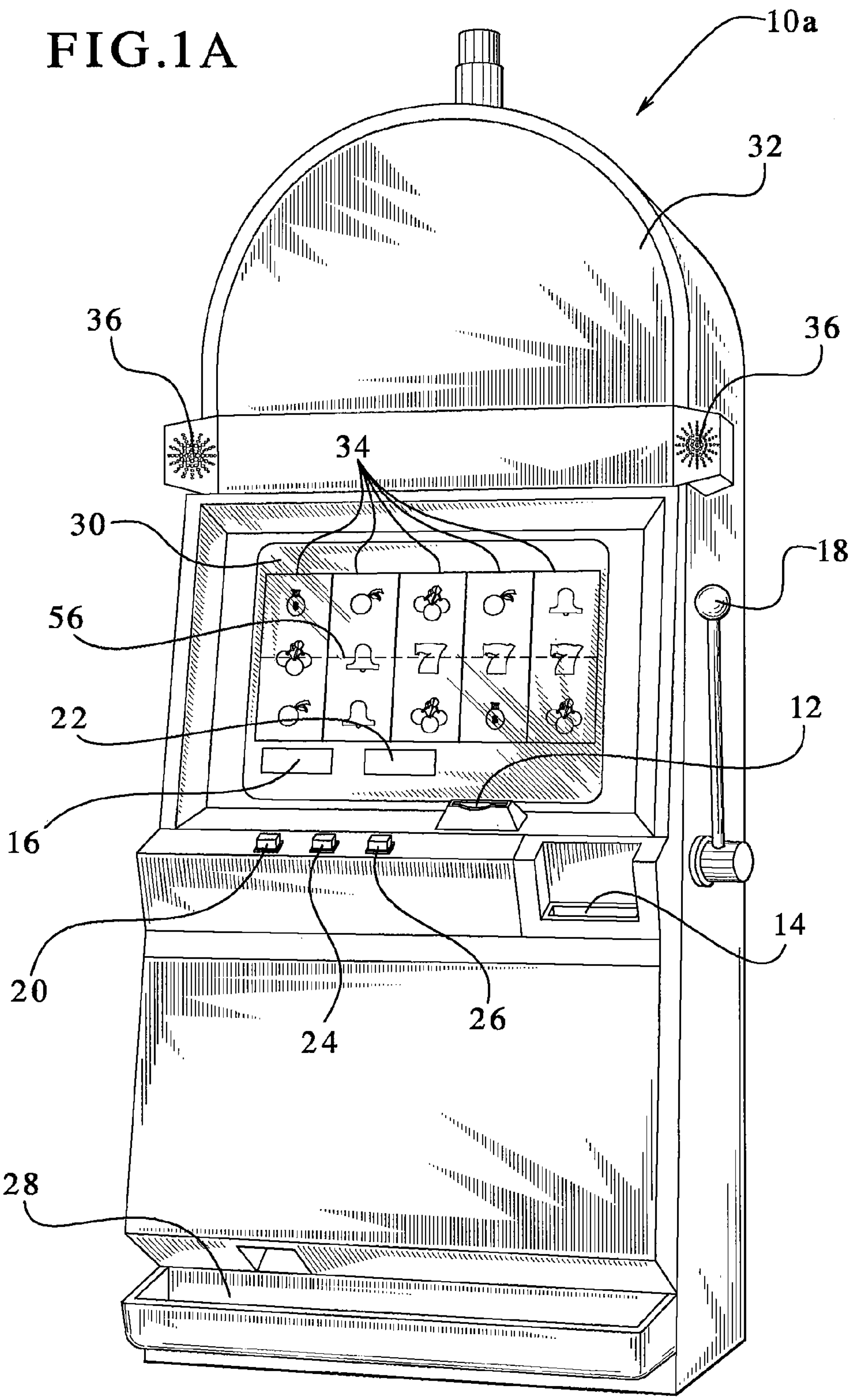
FIG. 1A is a front elevation view of a general embodiment of the gaming device of the present invention.
Figure 1B:
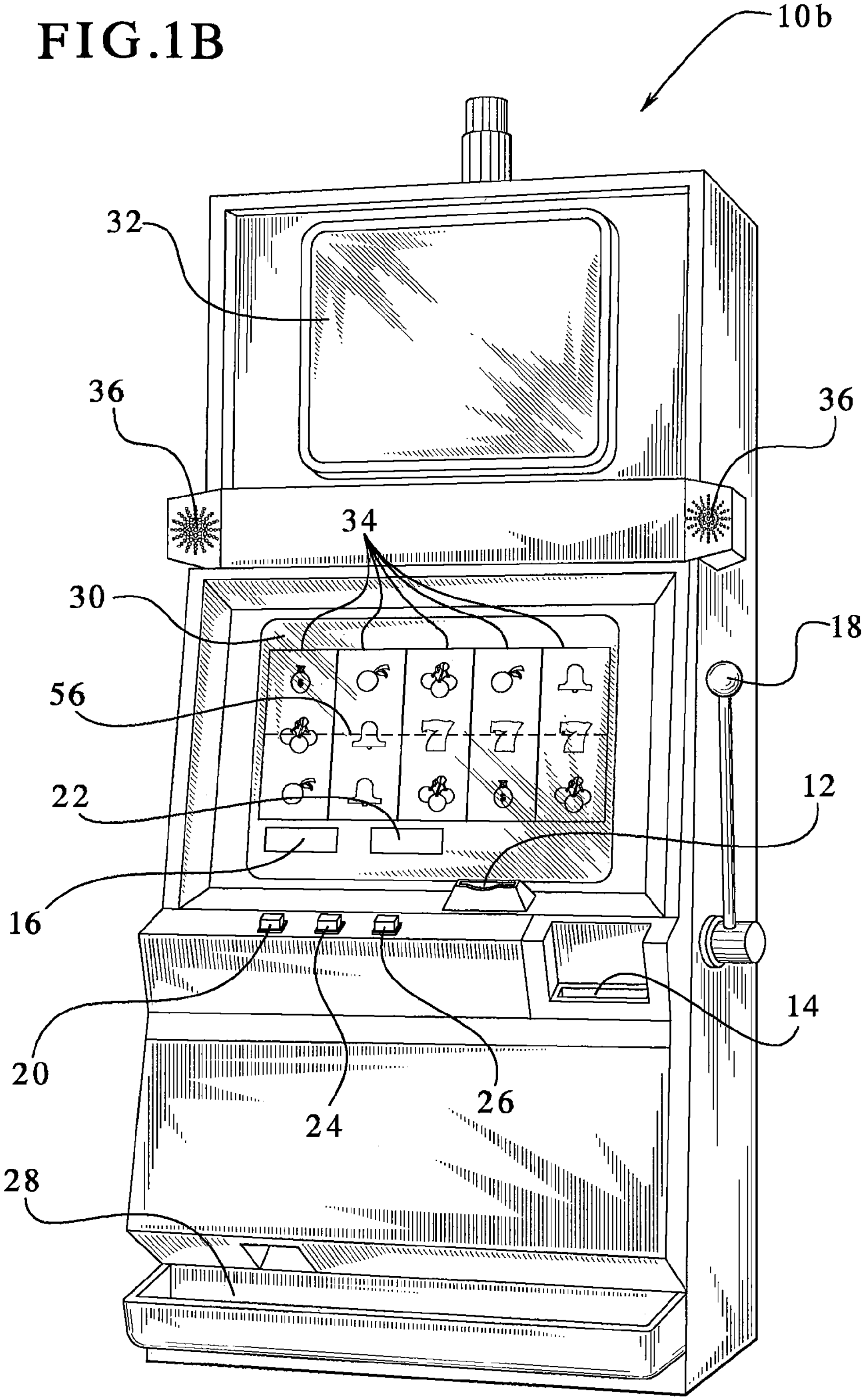
FIG. 1B is a front elevation view of a second embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

Gaming device 10 is in one embodiment a slot machine having the controls, displays and features of a conventional slot machine. It is constructed so that a player can operate it while standing or sitting, and is preferably mounted in a console or cabinet. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 may be adapted to incorporate any primary game such as slot, poker, blackjack or keno, any of their bonus triggering events and any of their bonus round games in conjunction with the present invention. The symbols and indicia used on and in gaming device 10 may be in mechanical, electronic, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. The gaming device may also include a conventional bet maximum button (not shown) and conventional payline bet buttons.

A player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 in one embodiment displays a plurality of reels 34 such as three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia or symbols such as bells, hearts, fruits, numbers, letters, bars or other images or symbols which preferably correspond to a theme associated with the gaming device 10. Furthermore, gaming device 10 preferably includes speakers 36 for making sounds or playing music.

Figure 2:
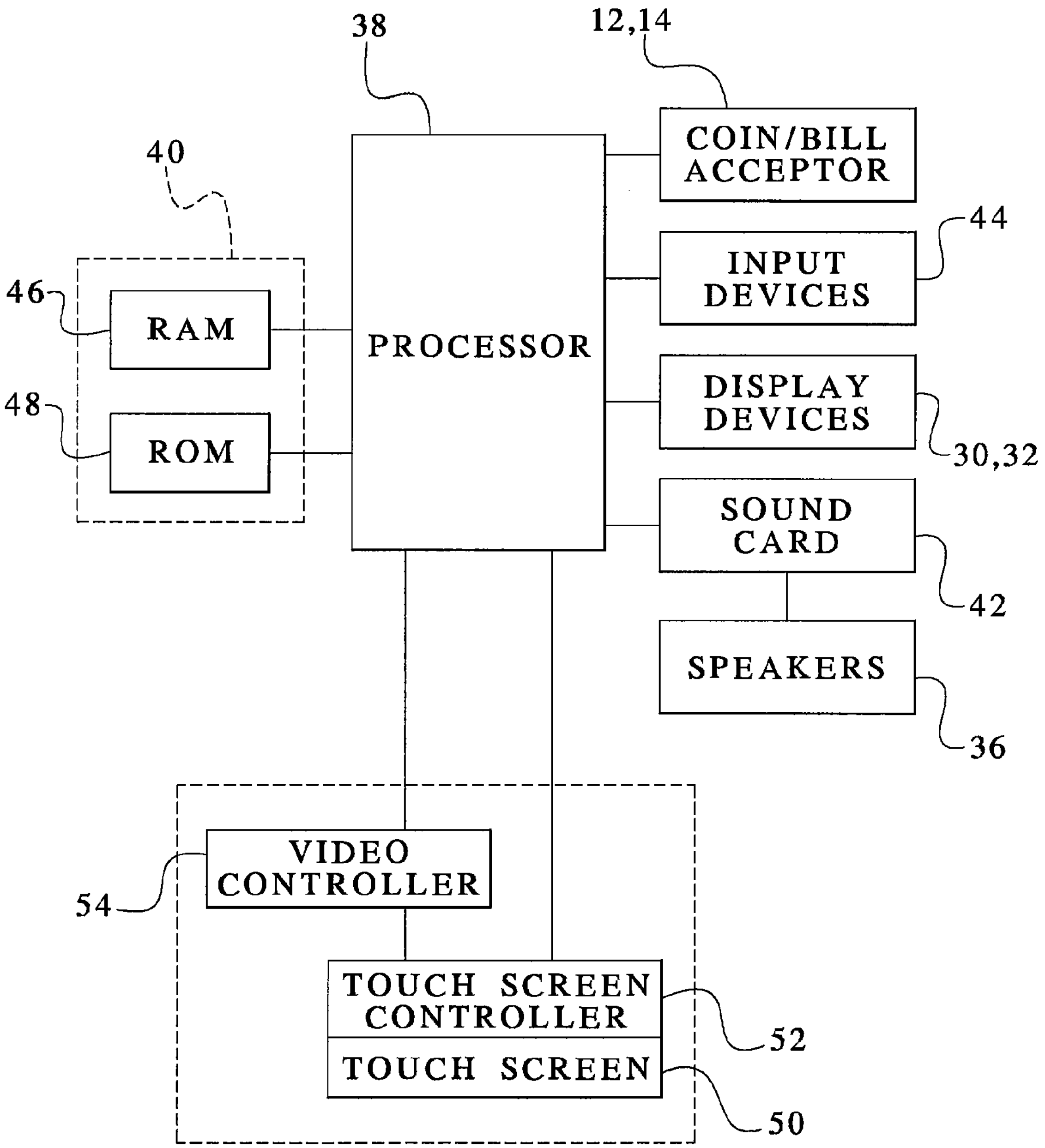
FIG. 2 is a schematic block diagram of the electronic configuration of one embodiment of the gaming device of the present invention.

As illustrated in FIG. 2, the general electronic combination of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The processor may include a main processor and a sub-processor which control certain features of the gaming device in conjunction with the main processor. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device as discussed in detail below. The gaming device 10 in one embodiment uses a video-based central display device 30 to enable the player to play the bonus round. In one embodiment as discussed below, the qualifying condition is a predetermined combination of indicia or symbols appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Re-Trigger

Figure 3A:
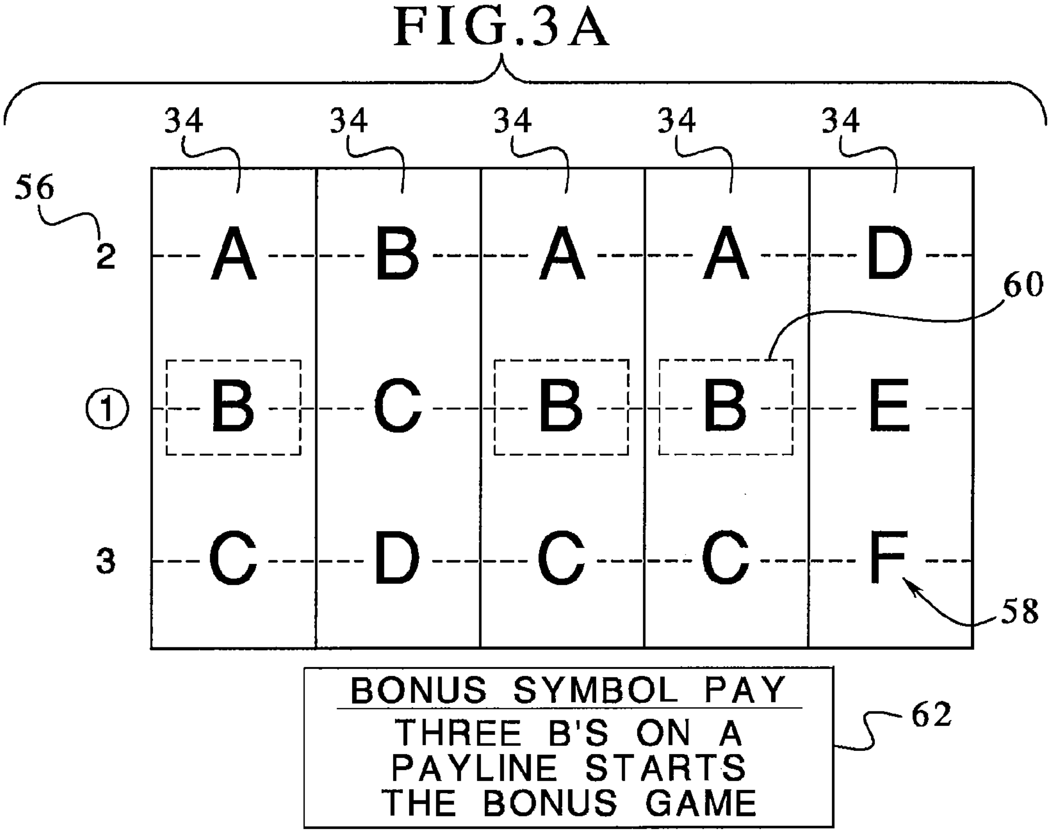
FIG. 3A is an enlarged front elevation view of one of the display devices of FIGS. 1A and 1B showing an embodiment of a bonus triggering symbol combination.

Referring now to FIG. 3A, a set of mechanical or video reels 34 is generally illustrated having symbols 58 designated as A through F. It should be appreciated that any suitable set of symbols could be used as the symbols 58 in accordance with the present invention. In this embodiment, the "B" symbols 60 are the bonus symbols and the appearance of three "B" symbols on any activated payline such as payline 1, triggers a bonus game as indicated by bonus display 62. Although in this example three "B" symbols are used to trigger the bonus game, it should be appreciated that any symbol combination having the same symbol or designated symbols may be used as the bonus triggering combination.

Figure 3B:
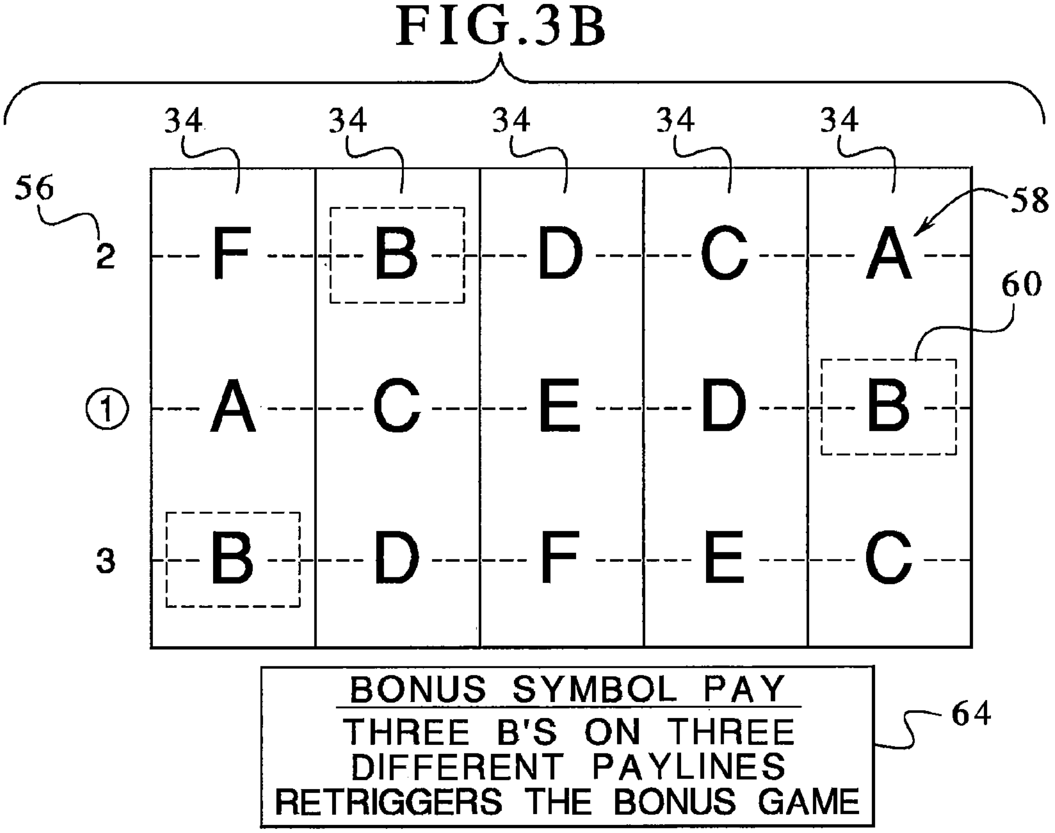
FIG. 3B is an enlarged front elevation view of one of the display devices of FIGS. 1A and 1B illustrating a bonus re-trigger symbol combination in a bonus game.

FIG. 3B illustrates one embodiment of the bonus game of the present invention where the bonus re-trigger occurs in the bonus game when the same symbols which trigger the bonus game in the base game are displayed in a scattered combination on multiple paylines. In this embodiment, the "B" symbol 60 is the bonus re-trigger symbol and any three "B" symbols on three paylines provides the bonus re-trigger in the bonus game as described in bonus display 64. Accordingly, as described above, in accordance with the present invention, the bonus re-trigger will occur more frequently than the bonus trigger because the bonus trigger will only occur when the bonus triggering symbols are aligned along a payline. The bonus re-trigger, however, will occur when the bonus triggering symbols are aligned along a payline or when the bonus triggering symbols occur along any payline.

Figure 4:
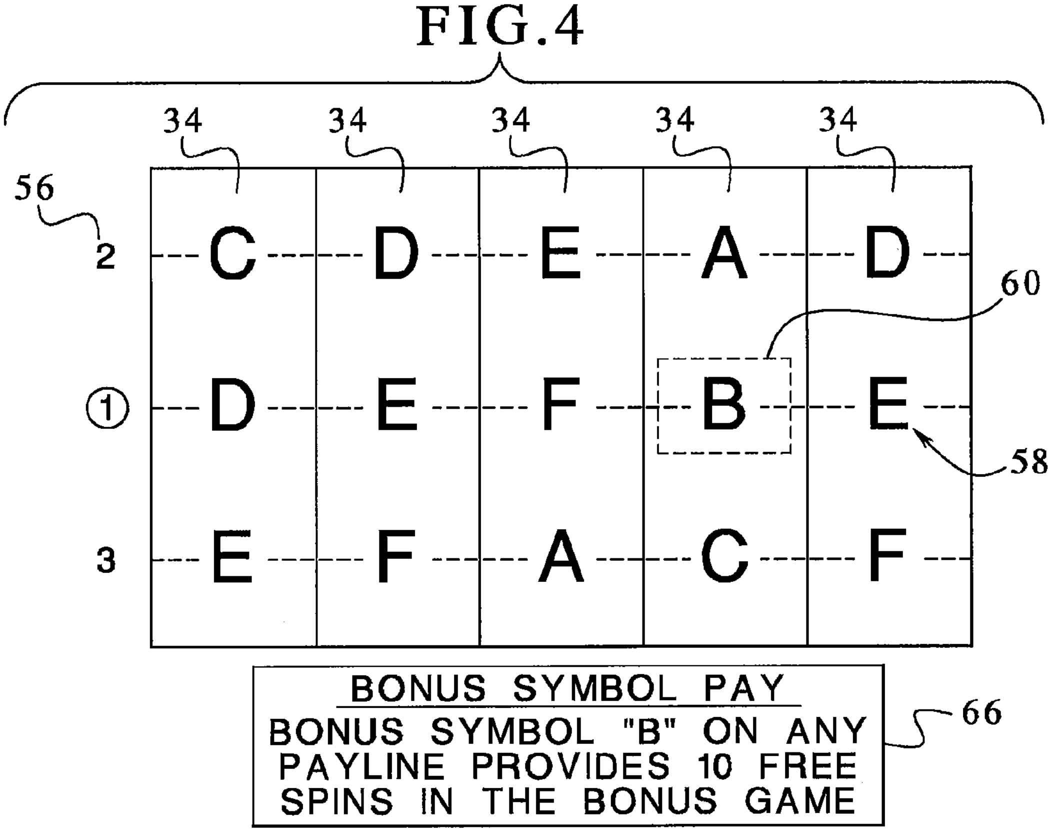
FIG. 4 is an enlarged front elevation view of one of the display devices of FIGS. 1A and 1B illustrating a bonus re-trigger in a bonus game where a player receives additional spins.

Referring now to FIG. 4, one embodiment of the present invention is shown where the bonus re-trigger occurs when one bonus triggering symbol occurs. In this example, the bonus game was triggered by obtaining a predetermined combination of the bonus symbols "B" 60 as illustrated in FIG. 3A, for instance. The bonus triggering symbol "B" is the bonus re-trigger symbol in the bonus game. In other words, any one of the bonus symbols "B" which in combination trigger the bonus game in the base game, is the symbol in the bonus game which provides a bonus re-trigger in the bonus game. In one embodiment, only one bonus symbol 60 located on any payline 56 is required to obtain a bonus re-trigger in the bonus game. It should be appreciated, however, that any combination of the same bonus symbols, which is more likely to occur in the bonus game than in the primary game, may be used to obtain a bonus re-trigger in the bonus game in accordance with the present invention. Thus, the present invention provides a bonus game which increases the chances of obtaining a bonus re-trigger using the same primary symbols by requiring less of those symbols in the bonus game to obtain a bonus re-trigger than in the primary game, or by requiring a more likely to occur combination of those symbols in the bonus game to obtain a re-trigger in the bonus game. Returning now to FIG. 4, the appearance of bonus symbol "B" 60 in the bonus game, causes a bonus re-trigger for the player in the bonus game. The bonus re-trigger is 10 free spins in the bonus game as designated by the bonus display 66.

Figure 5A:
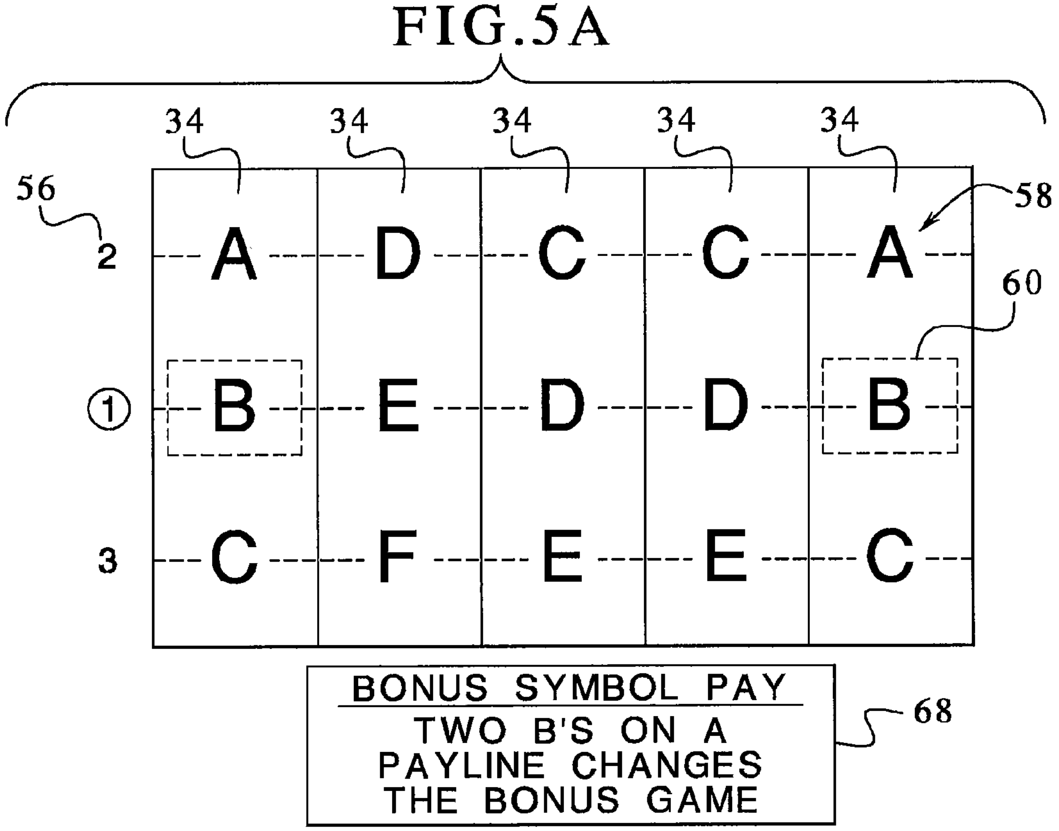
FIG. 5A is an enlarged front elevation view of one of the display devices of FIGS. 1A and 1B showing a bonus re-trigger where the bonus re-triggering combination is two "B" symbols on a payline.
Figure 5B:
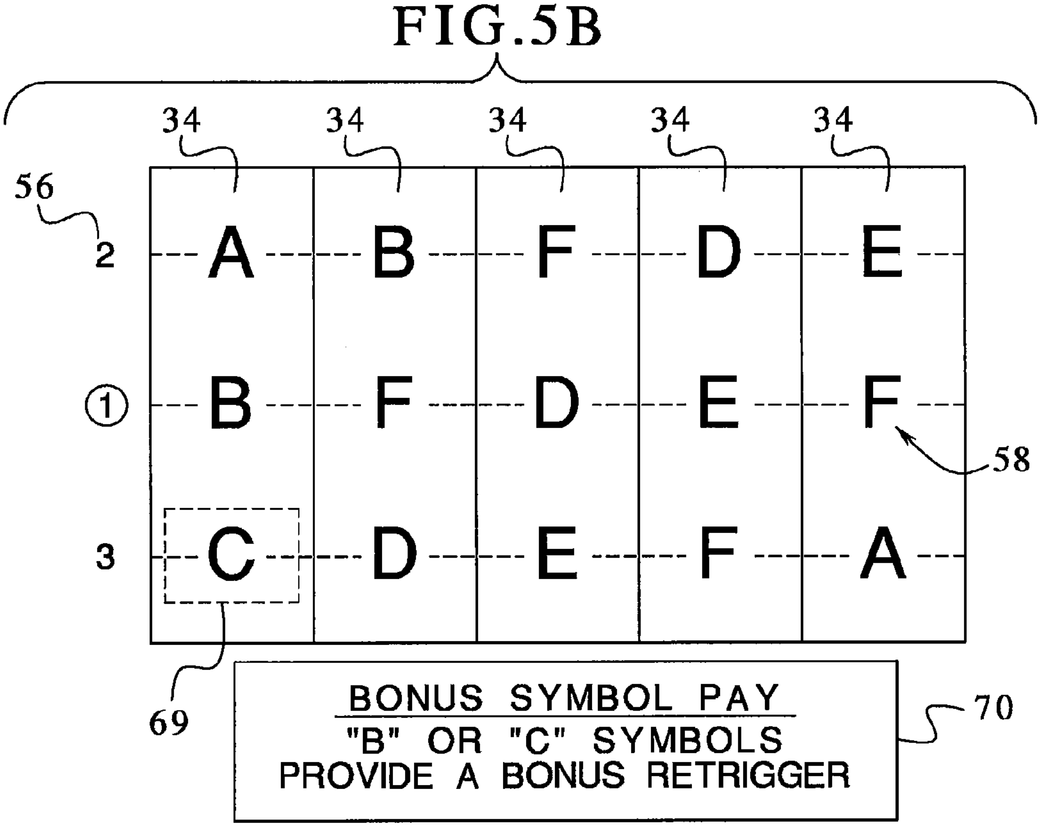
FIG. 5B is an enlarged front elevation view of one of the display devices of FIGS. 1A and 1B illustrating a bonus re-trigger where the bonus re-triggering symbol is a different symbol.

Another embodiment of the present invention is illustrated in FIGS. 5A and 5B. In this embodiment, the bonus re-trigger restructures or changes how the bonus game is subsequently re-triggered, initiated, played or the structure or type of the bonus game. Initially, the bonus game was triggered by obtaining three "B" symbols along a payline as shown in FIG. 3A, for instance. The bonus symbol "B" triggers the bonus re-trigger in the bonus game, which in this case, changes the bonus game re-triggering symbol combination or event.

In FIGS. 5A and 5B, a player obtains two "B" symbols which changes the bonus re-triggering symbol or bonus mode. In one embodiment, the probability of obtaining the bonus re-triggering symbol becomes even greater. FIG. 5A illustrates one embodiment where the player obtains two "B" symbols 60 on one payline 56 in the bonus game which changes the bonus game as indicated by bonus display 68. This changes the bonus game to include another bonus re-triggering symbol "C."

In FIG. 5B, the bonus re-triggering symbol also now includes the "C" symbol 69 on any payline as described in bonus display 70. Since the bonus retrigger symbols now also includes the "C" symbol 69, the player has a better chance of obtaining the bonus re-trigger because both the "B" symbol and the "C" symbol now provide the bonus re-trigger in this new, modified, or changed bonus game. The bonus re-trigger could be for instance, additional spins of the reels wherein a player can obtain bonus awards. The new bonus game could also change the paylines or other functions of the game, increase or decrease the number of reels in the base game, or change to an entirely new bonus game.

Figure 6:
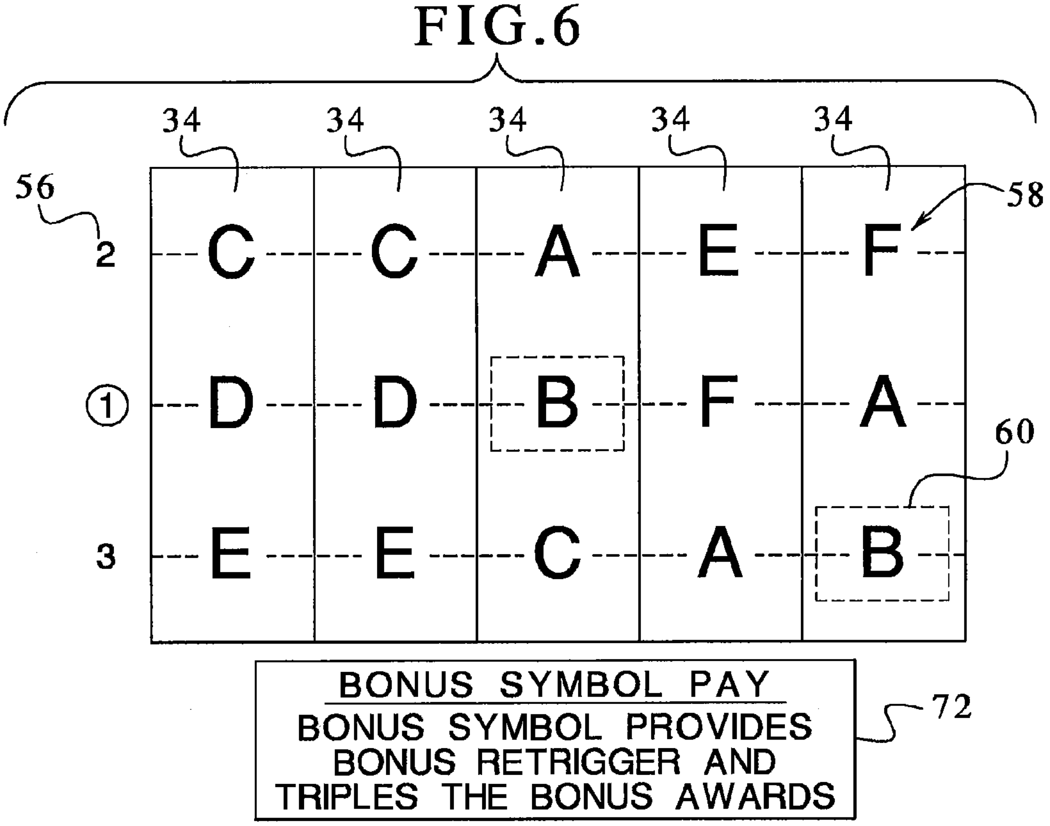
FIG. 6 is an enlarged front elevation view of one of the display devices of FIGS. 1A and 1B wherein the bonus re-trigger includes an award modification.

Referring now to FIG. 6, another embodiment of the present invention is shown where the bonus re-trigger additionally changes or modifies an award in the bonus game. In FIG. 6, the player entered the bonus game by obtaining a bonus triggering event that included three bonus symbols "B," designated by the numeral 60. The bonus symbol "B" is the bonus re-triggering symbol in the bonus game. The player obtains the bonus re-triggering symbol "B" on paylines one and three. Thus, the player receives the bonus re-trigger and a modification of the award provided to the player in the bonus game as described by bonus display 72, which includes tripling the bonus award values. It should be appreciated that any modifications of the bonus award values may be made including, but not limited to, multiplying the values by some factor or increasing the bonus award values by a fixed amount.

Accordingly, the present invention provides a gaming device which includes a secondary game triggering event in a primary game which triggers a secondary game, a secondary game re-triggering event in the secondary game which re-triggers the entire secondary game or a portion thereof, wherein the secondary game re-triggering event in the secondary game is more likely to occur in the secondary game than the secondary game triggering event in the primary game. Preferably, the secondary game re-triggering event in the secondary game and the secondary game triggering event in the primary game employ the same triggering symbols.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of a primary game upon a wager by a player, said primary game having a plurality of primary game symbols including a plurality of secondary game triggering symbols, wherein the secondary game triggering symbols can form a plurality of designated combinations of the secondary game triggering symbols;

(b) if one of said designated combinations of the secondary game triggering symbols occurs in said play of the primary game, provide a designated number of plays of a secondary game associated with said designated combination of the secondary game triggering symbols, wherein the secondary game has a plurality of secondary game symbols including the plurality of secondary game triggering symbols; and (c) in each play of the secondary game, for each one of said designated combinations of the secondary game triggering symbols which occurs, provide the designated number of plays of the secondary game associated with said one of the designated combinations of the secondary game triggering symbols, wherein said designated combination of the secondary game triggering symbols is more likely to occur in the secondary game than in the primary game.

2. The gaming system of claim 1, wherein the primary game symbols and the secondary game symbols are the same.

3. The gaming system of claim 1, wherein the primary game symbols and the secondary game symbols are different.

4. The gaming system of claim 1, wherein each of said designated combinations of the secondary game triggering symbols includes a designated quantity of secondary game triggering symbols.

5. The gaming system of claim 4, wherein each of said designated combinations of the secondary game triggering symbols includes a different quantity of secondary game triggering symbols.

6. The gaming system of claim 1, wherein each of said designated combinations of the secondary game triggering symbols is associated with a designated number of plays of the secondary game, said designated number of plays being at least one.

7. The gaming system of claim 6, wherein each of said designated combinations of the secondary game triggering symbols is associated with a different number of plays of the secondary game.

8. The gaming system of claim 6, wherein a plurality of said designated combinations of the secondary game triggering symbols are associated with a different number of plays of the secondary game.

9. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display an activation of a game upon a wager by a player, said game having a plurality of reels including a plurality of symbols, wherein said symbols can form at least one designated symbol combination of said symbols, and wherein at least one payline is associated with the reels;

(b) if, for said activation of the game, one of said designated symbol combinations is displayed on one of the paylines, provide a designated number of free activations of the reels associated with said one of the designated symbol combinations; and (c) for each provided free activation of the reels, for each one of said designated symbol combinations displayed on one of the paylines or in a scatter pay arrangement on the reels, such that said one of the designated symbol combinations is more likely to occur in said free activation of the reels than in said activation of the game, additionally provide the designated number of free activations of the reels associated with said one of the designated symbol combinations.

10. The gaming system of claim 9, wherein a plurality of paylines are associated with said reels.

11. The gaming system of claim 9, wherein each of said designated symbol combinations is associated with a different number of free activations of the reels.

12. The gaming system of claim 9, wherein a plurality of said designated symbol combinations are associated with a different number of free activations of the reels.

13. The gaming system of claim 9, wherein each of said designated symbol combinations includes a different quantity of symbols.

14. The gaming system of claim 9, wherein a plurality of said designated combinations include a different quantity of symbols.

15. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of a primary game upon a wager by a player, said primary game having a plurality of primary game reels including a plurality of primary game symbols, said primary game symbols including a plurality of first designated symbols which can form a plurality of designated combinations of the first designated symbols, each of said designated combinations of the first designated symbols associated with a designated number of activations of a plurality of secondary game reels;

(b) if, for said play of the primary game, one of said designated combinations of the first designated symbols is displayed on one of a plurality of paylines associated with the primary game reels, provide the designated number of activations of the secondary game reels associated with said one of the designated combinations of the first designated symbols, wherein said secondary game reels are associated with a plurality of secondary game symbols, including a plurality of second designated symbols which can form a plurality of designated combinations of the second designated symbols, each of said designated combinations of the second designated symbols associated with an additional designated number of activations of the secondary game reels; and (c) for each provided activation of the secondary game reels, for each one of said designated combinations of the second designated symbols displayed on one of a plurality of paylines associated with the secondary game reels or in a scatter pay arrangement on the secondary game reels, provide the additional designated number of activations of the secondary game reels associated with said designated combination of the second designated symbols, wherein said one of the designated combinations of the second designated symbols is more likely to occur in said activation of the secondary game reels than one of said designated combinations of the first designated symbols in the primary game.

16. The gaming system of claim 15, wherein said primary game reels and said secondary game reels are the same.

17. The gaming system of claim 15, wherein said primary game reels and said secondary game reels are different.

18. The gaming system of claim 15, wherein the first designated symbols and the second designated symbols are the same.

19. The gaming system of claim 15, wherein the first designated symbols and the second designated symbols are different.

20. The gaming system of claim 15, wherein each of said designated combinations of the first designated symbols is associated with a different number of activations of the secondary game reels.

21. The gaming system of claim 15, wherein a plurality of said designated combinations of the first designated symbols are associated with a different number of activations of the secondary game reels.

22. The gaming system of claim 15, wherein each of said designated combinations of the first designated symbols includes a different quantity of the first designated symbols.

23. The gaming system of claim 15, wherein a plurality of said designated combinations of the first designated symbols include a different quantity of the first designated symbols.

24. The gaming system of claim 15, wherein each of said designated combinations of the second designated symbols is associated with a different additional number of activations of the secondary game reels.

25. The gaming system of claim 15, wherein a plurality of said designated combinations of the second designated symbols are associated with a different additional number of activations of the secondary game reels.

26. The gaming system of claim 15, wherein each of said designated combinations of the second designated symbols includes a different quantity of the second designated symbols.

27. The gaming system of claim 15, wherein a plurality of said designated combinations of the second designated symbols include a different quantity of the second designated symbols.

28. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game, said primary game having a plurality of primary game symbols including a plurality of secondary game triggering symbols;

(b) display a secondary game upon the display of one of a plurality of predetermined combinations of said secondary game triggering symbols in said primary game, wherein said secondary game has a plurality of secondary game symbols including the plurality of secondary game triggering symbols; and (c) re-trigger the entire secondary game if one of said predetermined combinations of said secondary game triggering symbols is displayed in said secondary game, wherein said display of said one of the predetermined combinations is more likely to occur in said secondary game than in said primary game.

29. The gaming system of claim 28, wherein the primary game symbols and secondary game symbols are the same.

30. The gaming system of claim 28, wherein the primary game symbols and secondary game symbols are different.

31. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game, said primary game having a plurality of primary game symbols including a plurality of secondary game triggering symbols;

(b) display a secondary game if one of a plurality of predetermined combinations of said secondary game triggering symbols is displayed in said primary game, wherein said secondary game has a plurality of secondary game symbols including the plurality of secondary game triggering symbols; and (c) provide at least one additional play of the secondary game upon the display of one of said plurality of predetermined combinations of said secondary game triggering symbols in said secondary game, wherein said display of said one of the predetermined combinations is more likely to occur in the secondary game than in the primary game.

32. The gaming system of claim 31, wherein the primary game symbols and secondary game symbols are the same.

33. The gaming system of claim 31, wherein the primary game symbols and secondary game symbols are different.

34. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game, said primary game having a plurality of primary game symbols including a plurality of secondary game triggering symbols;

(b) display a secondary game if a predetermined combination of a plurality of said secondary game triggering symbols is displayed in said primary game, wherein said secondary game has a plurality of secondary game symbols including the plurality of secondary game triggering symbols; and (c) re-trigger the entire secondary game at least once if a designated number of said secondary game triggering symbols are displayed in the secondary game, wherein said designated number is at least one but less than all of the plurality of said secondary game triggering symbols of the predetermined combination.

35. The gaming system of claim 34, wherein the primary game symbols and secondary game symbols are the same.

36. The gaming system of claim 34, wherein the primary game symbols and secondary game symbols are different.

37. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game, said primary game having a plurality of primary game symbols including a plurality of secondary game triggering symbols;

(b) display a secondary game if a predetermined combination of a plurality of said secondary game triggering symbols is displayed in said primary game, wherein said secondary game has a plurality of secondary game symbols including the plurality of secondary game triggering symbols; and (c) provide at least one additional play of the secondary game if a designated number of said secondary game triggering symbols is displayed in said secondary game, wherein said designated number is at least one but less than all of the plurality of said secondary game triggering symbols of the predetermined combination.

38. The gaming system of claim 37, wherein the primary game symbols and secondary game symbols are the same.

39. The gaming system of claim 37, wherein the primary game symbols and secondary game symbols are different.

* * * * *